(12) United States Patent
Schmidt et al.

(10) Patent No.: US 10,494,109 B2
(45) Date of Patent: Dec. 3, 2019

(54) SYSTEMS AND METHODS FOR RETAINING REMOVABLE PANEL WHEN DEPLOYING EVACUATION SYSTEM

(71) Applicant: GOODRICH CORPORATION, Charlotte, NC (US)

(72) Inventors: Ryan Schmidt, Gilbert, AZ (US); William Tad Larner, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 636 days.

(21) Appl. No.: 15/148,632

(22) Filed: May 6, 2016

(65) Prior Publication Data

US 2017/0320583 A1 Nov. 9, 2017

(51) Int. Cl.
B64D 25/14 (2006.01)

(52) U.S. Cl.
CPC .................. B64D 25/14 (2013.01)

(58) Field of Classification Search
CPC ........ B64D 25/16; B64D 25/12; B64D 25/14; B64D 25/18; B64D 25/08; B64C 1/24; B60P 7/0823; B64G 1/22; A62B 1/20; B65G 11/00; E06B 9/00; E06C 5/26; E06C 5/44; E06C 5/06; B63C 9/22
See application file for complete search history.

(56) References Cited

U.S. PATENT DOCUMENTS

| | | | | |
|---|---|---|---|---|
| 3,771,749 A | * | 11/1973 | Smialowicz | B64D 25/14 182/48 |
| 5,102,070 A | * | 4/1992 | Smialowicz | B64D 25/14 182/48 |
| 7,467,764 B2 | * | 12/2008 | Hintzman | B64D 25/14 182/48 |
| 2014/0224937 A1 | | 8/2014 | Brown | |
| 2014/0366341 A1 | * | 12/2014 | Rivault | B64D 25/14 24/714.7 |

FOREIGN PATENT DOCUMENTS

| | | |
|---|---|---|
| EP | 39466 A1 | 11/1981 |
| EP | 1254834 | 11/2002 |
| EP | 1759993 | 3/2007 |
| EP | 1911674 | 4/2008 |

OTHER PUBLICATIONS

EP Search Report dated Oct. 5, 2017 in EP Application No. 17166197.8.

* cited by examiner

*Primary Examiner* — Medhat Badawi
*Assistant Examiner* — Vicente Rodriguez
(74) *Attorney, Agent, or Firm* — Snell & Wilmer, L.L.P.

(57) ABSTRACT

Systems and methods for evacuation systems are provided. A evacuation system for an aircraft may include a packboard, an inflatable, a blow-out panel for the packboard, and a plurality of straps coupled to the blow-out panel. A first strap is coupled between an inner surface of the blow-out panel and the packboard and a second strap is coupled between the inner surface of the blow-out panel and the inflatable. The first strap is coupled to the blow-out panel in close proximity to a first edge of the blow-out panel and the second strap is coupled to the blow-out panel in close proximity to a second edge of the blow-out panel, the first edge being positioned opposite the second edge of the blow-out panel. The blow-out panel may be retained to the evacuation system after the inflatable is deployed.

20 Claims, 7 Drawing Sheets

SYSTEMS AND METHODS FOR RETAINING REMOVABLE PANEL WHEN DEPLOYING EVACUATION SYSTEM

FIELD

The present disclosure relates to aircraft evacuation systems and, in particular, to retaining systems for evacuation system blow-out panels.

BACKGROUND

Emergency evacuation systems may be used to exit an aircraft absent a jet way or other suitable means of egress for passengers. The evacuation system may deploy from the side of an aircraft fuselage, for example. A blow-out panel covers a compartment where the evacuation system is stored. A portion of the evacuation system (i.e., a slide or a raft) may begin deploying, which may cause the blow-out panel to open and allow the evacuation system to continue deployment.

SUMMARY

Systems and methods for evacuation systems for aircraft are provided herein. An evacuation system for an aircraft may comprise a packboard, an inflatable configured to be packed into the packboard, a blow-out panel for the packboard, the blow-out panel having an outboard surface comprising an air-flow surface and having an inner surface, a first strap coupled to the inner surface of the blow-out panel and to the packboard and a second strap coupled to the inner surface of the blow-out panel and to the inflatable. The first strap may be coupled to the blow-out panel in close proximity to a first edge of the blow-out panel and the second strap may be coupled to the blow-out panel in close proximity to a second edge of the blow-out panel, the first edge being positioned opposite the second edge of the blow-out panel.

In various embodiments, a third strap may be coupled between the blow-out panel and the packboard. The first strap may be located in close proximity to a first corner of the blow-out panel and the third strap may be located in close proximity to a second corner of the blow-out panel. The second strap may be located between 25% and 75% of a distance between a third corner of the blow-out panel and a fourth corner of the blow-out panel. A third strap may be coupled between the blow-out panel and the inflatable. The second strap may be located in close proximity to third corner of the blow-out panel and the third strap may be located in close proximity to a fourth corner of the blow-out panel. The first strap may be located between 25% and 75% of a distance between a first corner of the blow-out panel and a second corner of the blow-out panel of the blow-out panel. A fourth strap may be coupled between the blow-out panel and the packboard. The first strap may be located in close proximity to a first corner of the blow-out panel and the fourth strap may be located in close proximity to a second corner of the blow-out panel. The second strap may be coupled to an outboard portion of the inflatable in response to the inflatable being in a fully deployed position.

A method for retaining a blow-out panel to an evacuation system may comprise attaching a first end of a first strap to an inner surface of the blow-out panel, attaching a second end of the first strap to a packboard, attaching a first end of a second strap to the inner surface of the blow-out panel, and attaching a second end of the second strap to an inflatable.

In various embodiments, the method may further comprise providing at least one of the first strap, the second strap, the blow-out panel, the packboard, or the inflatable. The attaching the second end of the second strap to the inflatable may comprise attaching the second end to an outboard portion of the inflatable. The attaching may include at least one of sewing, adhering, coupling via a fastener, or coupling via a shackle. The method may further comprise attaching a first end of a third strap to the blow-out panel, and attaching a second end of the third strap to the packboard.

An evacuation system for an aircraft may comprise an inflatable, a packboard for the inflatable, a plurality of straps, a blow-out panel coupled between the inflatable and the packboard via the plurality of straps, the plurality of straps including at least a first strap and a second strap, wherein the first strap is coupled between an inner surface of the blow-out panel and the packboard and the second strap is coupled between the inner surface of the blow-out panel and the inflatable, and wherein the blow-out panel is configured to be suspended between an outboard portion of the inflatable and the packboard in response to the inflatable deploying to a fully deployed position.

In various embodiments, the packboard may be located above a wing of the aircraft. The plurality of straps may comprise at least one of wire, cable, webbing rope, string, or tape. The second strap may be coupled between the inner surface of the blow-out panel and an outboard portion of the inflatable in response to the inflatable deploying to a fully deployed position. The first strap and the second strap may be pulled taught in response to the inflatable deploying to the fully deployed position.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Evacuation systems of the present disclosure include a blow-out panel removably coupled to a packboard, wherein an inflatable is stored. The blow-out panel may decouple from the packboard in response to the inflatable being deployed. In various embodiments, a plurality of straps may be coupled to the blow-out panel in order to retain the blow-out panel to the evacuation system. Thus, in response to the inflatable being deployed, the blow-out panel may be coupled between the inflatable and the packboard via the plurality of straps.

Figure 1:
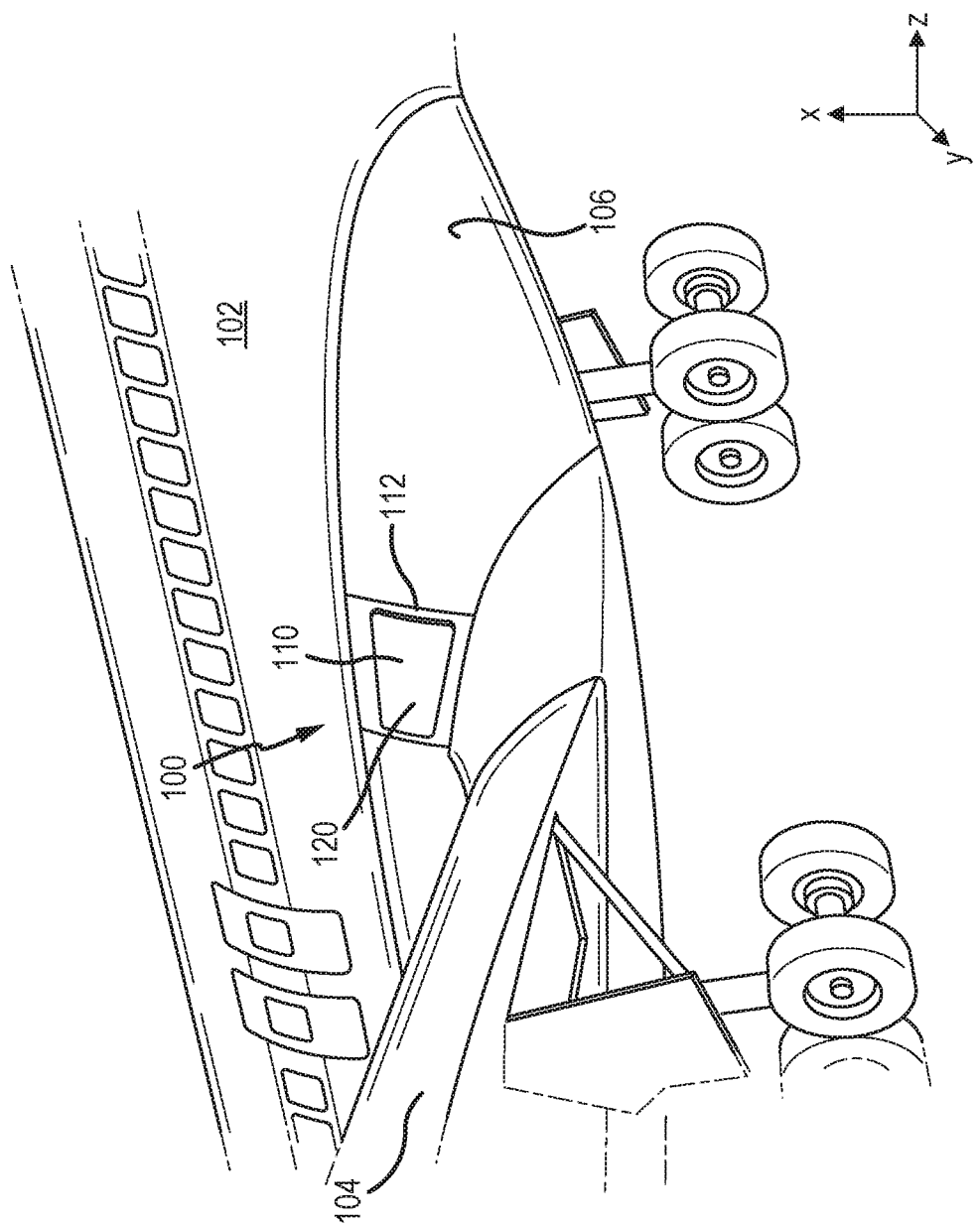
FIG. 1 illustrates an aircraft fuselage having a blow-out panel, in accordance with various embodiments.

With reference to FIG. 1, a partial perspective view of an aircraft having an evacuation system 100 is illustrated, in accordance with various embodiments. Evacuation system 100 may include packboard 112 and blow-out panel (BOP) 110. In various embodiments, an aircraft may comprise a fuselage 102 and a wing 104. Wing 104 may be mechanically coupled to fuselage 102 at a fairing 106. Packboard 112 may be located in fairing 106. Packboard 112 and BOP 110 may be located above wing 104. However, in various embodiments, packboard 112 may be located in fuselage 102. In this manner, packboard may be coupled to at least one of fairing 106 or fuselage 102. BOP 110 may be coupled to packboard 112, in accordance with various embodiments. BOP 110 is removably coupled to packboard 112. BOP 110 may comprise an outboard surface 120. Outboard surface 120 of BOP 110 may comprise an air-flow surface. It should be understood that FIG. 1 provides an exemplary aircraft configuration and that it is contemplated herein that evacuation system 100 may be used with any suitable wing/fuselage configuration.

Figure 2A:
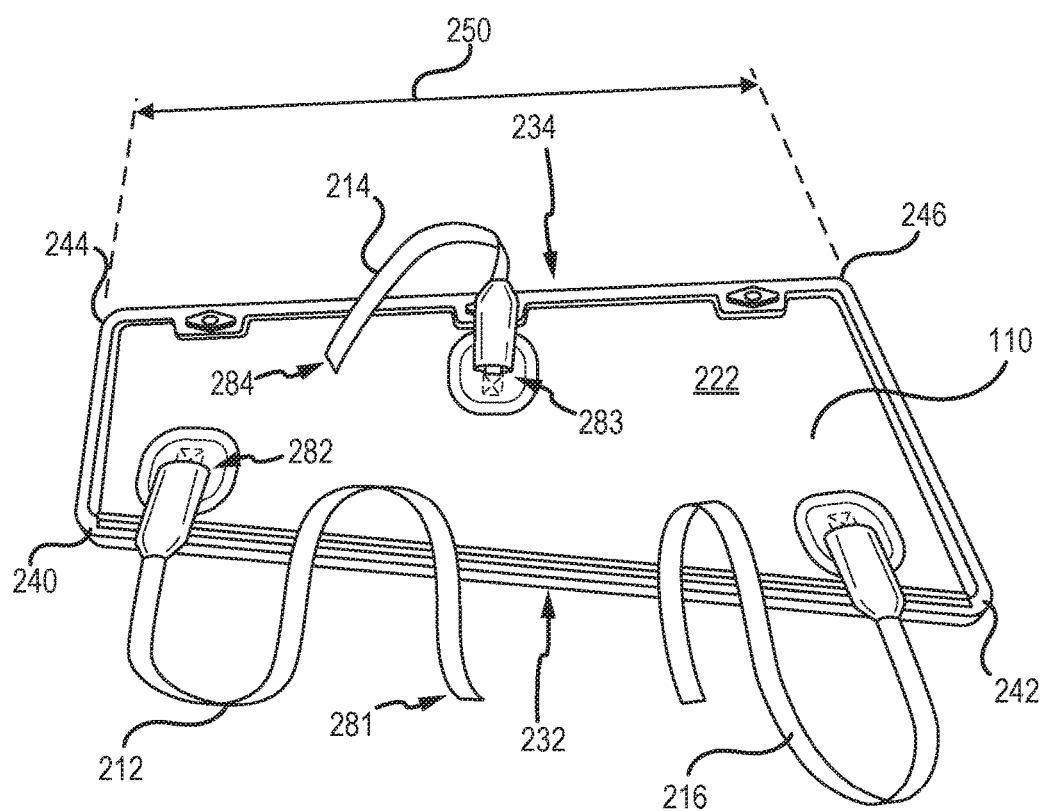
FIGS. 2A-2C illustrate a blow-out panel having a number of straps, in accordance with various embodiments.

With combined reference to FIG. 1 and FIG. 2A, BOP 110 may be coupled to packboard 112 via one or more straps, such as strap 212. In various embodiments, strap 212 may comprise at least one of wire, cable, webbing (e.g., nylon or polyester webbing) rope, string, and tape. A strap may be directly coupled to the BOP 110, wherein the term "directly" in this regard means that there are no other members between the strap and the BOP other than perhaps an attachment feature, fastener, or other means for coupling a strap to a BOP.

With reference to FIG. 2A, BOP 110 may comprise a number of corners including first corner 240, second corner 242, third corner 244, and fourth corner 246. BOP 110 may include inner surface 222. Inner surface 222 may face inboard (i.e., the negative y-direction in FIG. 1) when in an installed position, as illustrated in FIG. 1. In various embodiments, BOP 110 may comprise a quadrilateral-type shape.

In various embodiments, BOP 110 may be coupled to three straps including first strap 212, second strap 214, and third strap 216. First strap 212 may be coupled directly to BOP 110. First strap 212 may be coupled to BOP 110 in close proximity to first edge 232, wherein the term "close proximity" in this regard means that the first strap 212 is closer to the first edge 232 than the second edge 234, in accordance with various embodiments. First strap 212 may be coupled to BOP 110 in close proximity to first corner 240, wherein the term "close proximity" in this regard means that first strap 212 is coupled closer to first corner 240 than to second corner 242, in accordance with various embodiments. In various embodiments, first strap 212 may be coupled to packboard 112 (see FIG. 1 and FIG. 4). In various embodiments, second strap 214 may be coupled directly to BOP 110. Second strap 214 may be coupled to BOP 110 in close proximity to second edge 232, wherein the term "close proximity" in this regard means that second strap 214 is closer to second edge 234 than first edge 232, in accordance with various embodiments. Second strap 214 may be coupled to BOP 110 at a point located between third corner 244 and a fourth corner 246. Second strap 214 may be coupled to BOP 110 at a location between 25% and 75% of a distance 250 between third corner 244 and fourth corner 246. Second strap 214 may be coupled to BOP 110 at a location midway or substantially midway between third corner 244 and a fourth corner 246. Second strap 214 may be coupled to inflatable 460 (see FIG. 4). In various embodiments, third strap 216 may be coupled directly to BOP 110. Third strap 216 may be coupled to BOP 110 in close proximity to first edge 232, wherein the term "close proximity" in this regard means that the third strap 216 is closer to the first edge 232 than the second edge 234, in accordance with various embodiments. Third strap 216 may be coupled to BOP 110 in close proximity to second corner 242, wherein the term "close proximity" in this regard means that third strap 216 is coupled closer to second corner 242 than to first corner 240, in accordance with various embodiments. Third strap 216 may be coupled to packboard 112 (see FIG. 1 and FIG. 4). The strap attachment locations may cause the BOP 110 to pivot away from an aircraft fuselage in a controlled manner in response to an inflatable being deployed.

Figure 3:
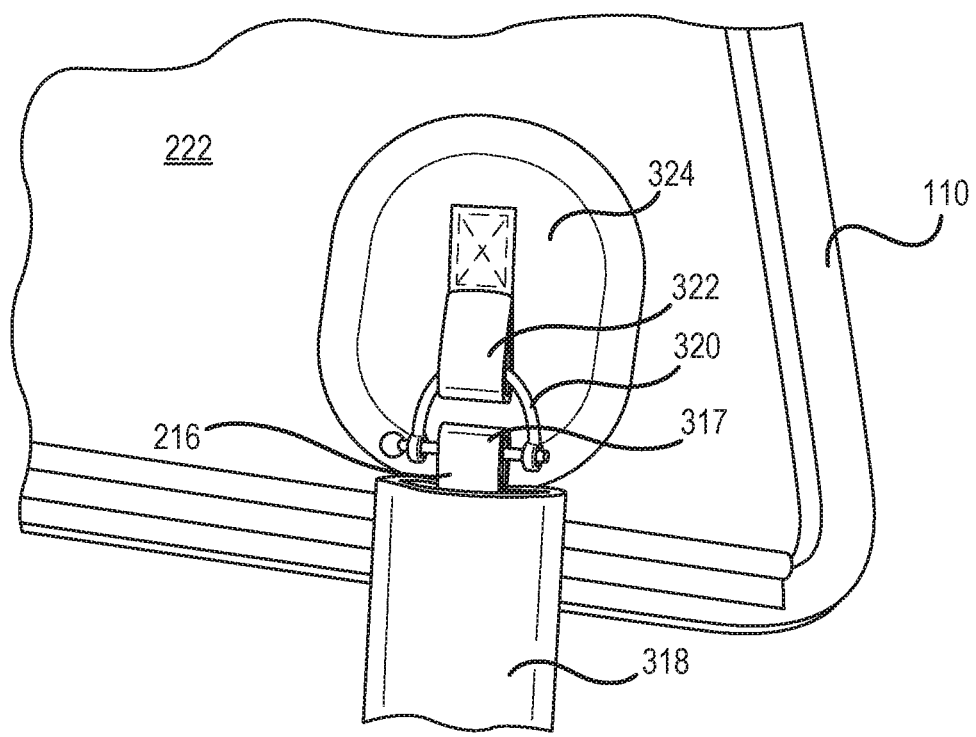
FIG. 3 illustrates a strap coupled to an inner surface of a blow-out panel via a shackle, in accordance with various embodiments.

With reference to FIG. 3, a strap, such as third strap 216 for example, may be coupled to inner surface 222 of BOP 110 via a shackle 320 and a loop 322. Strap 216 may comprise a loop (also referred to herein as a first loop) 317. A loop (also referred to herein as a second loop) 322 may be attached to inner surface 222. Loop 322 may be adhered onto inner surface 222. For example, loop 322 may be sewn onto a material 324 wherein the material is 324 adhered to inner surface 222. Shackle 320 may extend through loop 317 and through loop 322, thus coupling strap 216 to inner surface 222. Although illustrated as being coupled via a shackle 320, it is contemplated herein that strap 216 may be attached to inner surface 222 via any suitable fastener, means, or method.

In various embodiments, a sleeve 318 may be configured to slide over shackle 320. Sleeve 318 may be coupled to strap 216. Sleeve 318 may slide relative to strap 216 to cover shackle 320. Sleeve 318 may protect adjacent components, such as an inflatable, from shackle 320.

Figure 4:
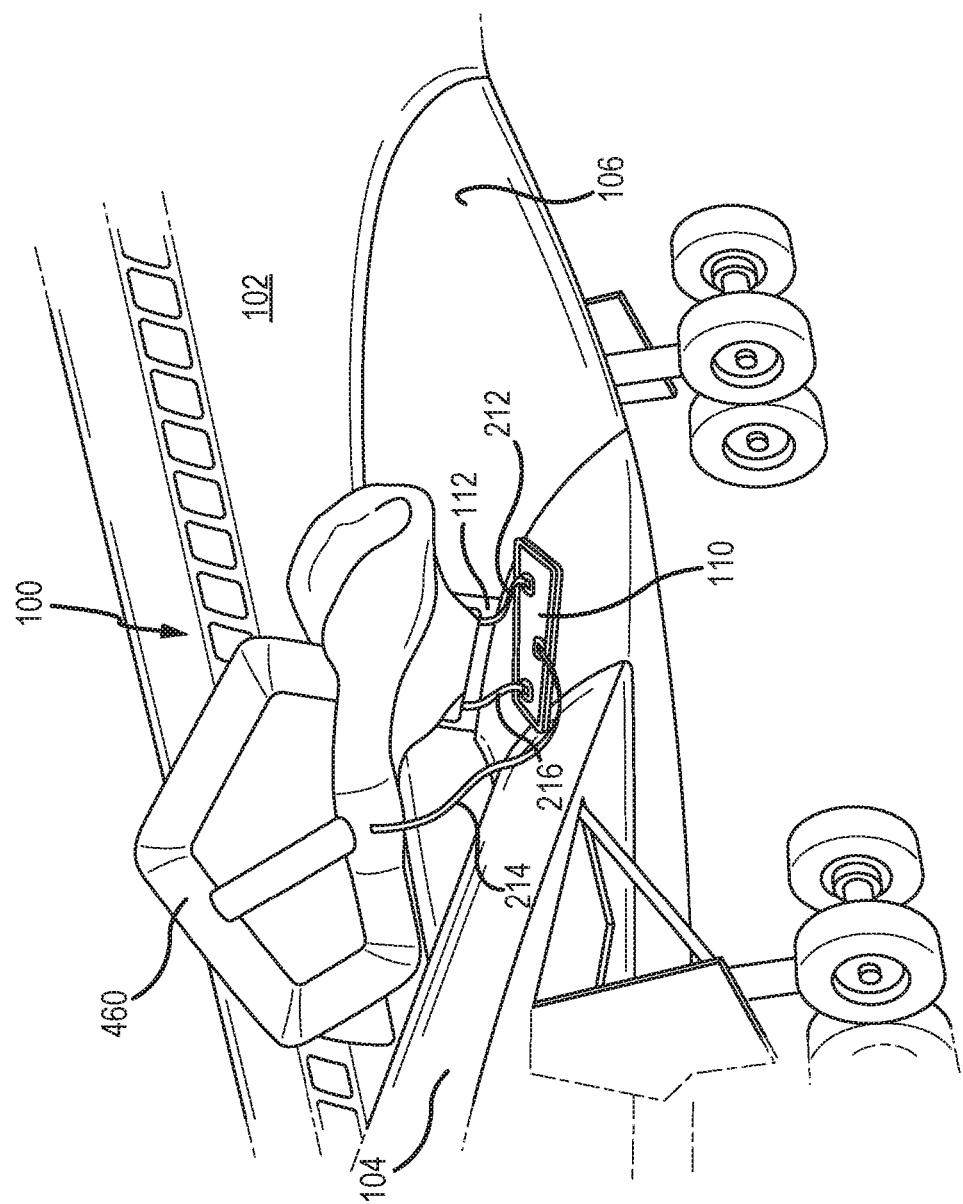
FIG. 4 illustrates a blow-out panel coupled between an inflatable and a packboard via a number of straps during deployment of the inflatable, in accordance with various embodiments.

With respect to FIG. 4, elements with like element numbering, as depicted in FIG. 1, are intended to be the same and will not necessarily be repeated for the sake of clarity.

With reference to FIG. 4, an inflatable 460 being deployed from a packboard 112 is illustrated, in accordance with various embodiments. Before deployment, inflatable 460 may be positioned or "packed" into packboard 112. During deployment, BOP 110 may be decoupled from packboard 112. During deployment, inflatable 460 may begin to inflate with air. During deployment, inflatable 460 may exit packboard 112. During deployment, BOP 110 may be suspended between inflatable 460 and packboard 112. First strap 212, second strap 214, and third strap 216 may retain BOP 110 to evacuation system 100.

Figure 5:
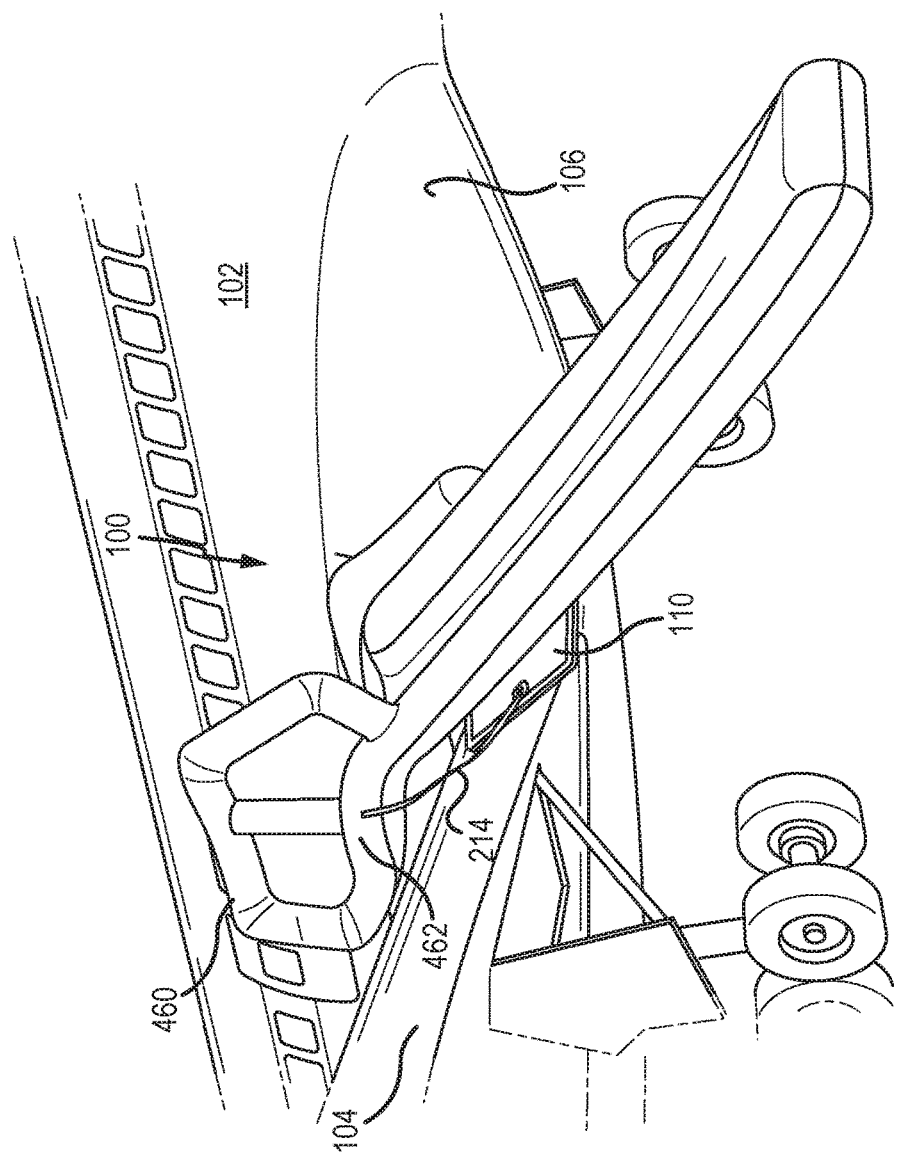
FIG. 5 illustrates a blow-out panel coupled between an inflatable and a packboard via a number of straps after deployment of the inflatable, in accordance with various embodiments.

With reference to FIG. 5, inflatable 460 is illustrated in a fully deployed position, in accordance with various embodiments. BOP 110 may be located beneath inflatable 460 in response to inflatable 460 moving to a deployed position, as shown in FIG. 5. BOP 110 may be located between inflatable 460 and wing 104 in response to inflatable 460 moving to a deployed position, as shown in FIG. 5. BOP 110 may be coupled between inflatable 460 and packboard 112 (see FIG. 4) in response to inflatable 460 moving to a deployed position, as shown in FIG. 5. Second strap 214 may be coupled to outboard portion 462 of inflatable 460 in response to inflatable 460 moving to a deployed position, as shown in FIG. 5. Second strap 214 may be taut in response to inflatable 460 moving to a deployed position, as shown in FIG. 5. Configuring second strap 214 to be taut in response to inflatable 460 moving to a deployed position may prevent BOP 110 from "flapping" and causing damage to itself or to adjacent components, such as wing 104 and inflatable 460. Inner surface (see FIG. 2A) of BOP 110 may face inflatable 460 in response to inflatable 460 being in a deployed position.

Figure 2B:
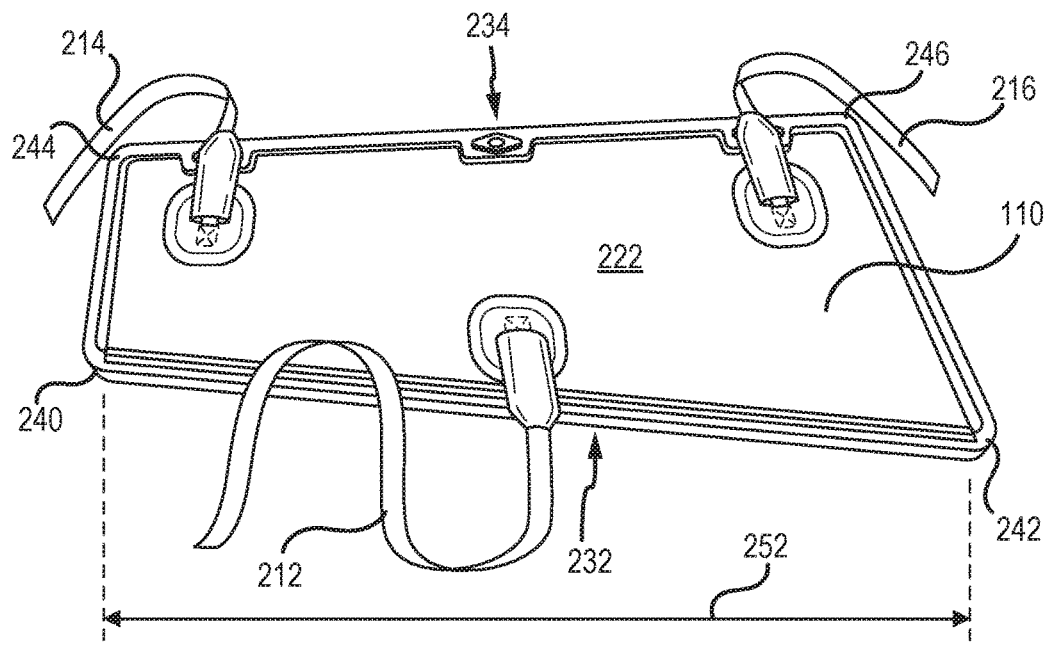

With reference to FIG. 2B, an inboard view of BOP 110 is illustrated, in accordance with various embodiments. In various embodiments, first strap 212 may be coupled to BOP 110 at a location between 25% and 75% of a distance 252 between first corner 240 and second corner 242. First strap 212 may be coupled to BOP 110 at a location midway, or substantially midway, between first corner 240 and second corner 242. In various embodiments, second strap 214 may be coupled to BOP 110 in close proximity to third corner 244, wherein the term "close proximity" in this regard means that second strap 214 is coupled closer to third corner 244 than to fourth corner 246. In various embodiments, third strap 216 may be coupled to BOP 110 in close proximity to second edge 234, wherein the term "close proximity" in this regard means that third strap 216 is closer to second edge 234 than first edge 232. Third strap 216 may be coupled to BOP 110 in close proximity to fourth corner 246, wherein the term "close proximity" in this regard means that third strap 216 is coupled closer to fourth corner 246 than to third corner 244, in accordance with various embodiments. Third strap 216 may be coupled to inflatable 460 (see FIG. 4).

Figure 2C:
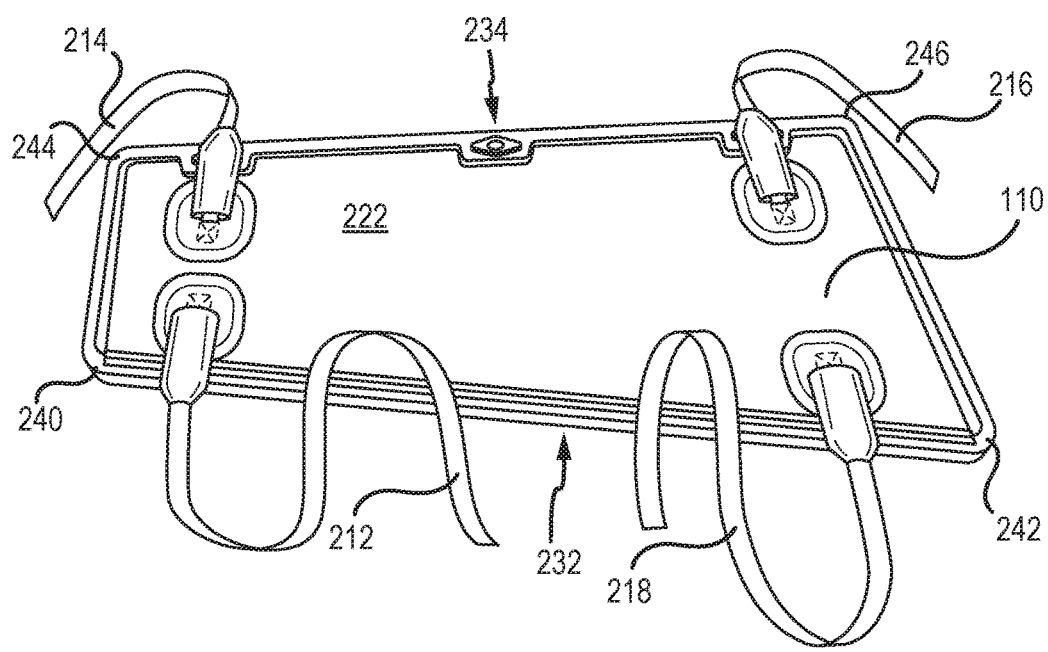

With reference to FIG. 2C, an inboard view of BOP 110 is illustrated, in accordance with various embodiments. In various embodiments, fourth strap 218 may be coupled directly to BOP 110. Fourth strap 218 may be coupled to BOP 110 in close proximity to first edge 232, wherein the term "close proximity" in this regard means that fourth strap 218 is closer to first edge 232 than second edge 234, in accordance with various embodiments. Fourth strap 218 may be coupled to BOP 110 in close proximity to second corner 242, wherein the term "close proximity" in this regard means that fourth strap 218 is coupled closer to second corner 242 than to first corner 240, in accordance with various embodiments. Fourth strap 218 may be coupled to packboard 112 (see FIG. 1 and FIG. 4). Thus, fourth strap 218 may be coupled between packboard 112 and BOP 110.

In various embodiments, the addition of a third strap (i.e., third strap 216) may add stability to BOP 110 when BOP 110 is suspended between inflatable 460 and packboard 112. For example, a third strap may prevent BOP 110 from rotating. Similarly, a fourth strap may provide further stability in this regard.

With combined reference to FIG. 1, FIG. 2A, and FIG. 5, straps (i.e., first strap 212) coupled to first edge 232 of BOP 110 may vary in length with respect to straps (i.e., second strap 214) coupled to second edge 234 of BOP 110. For example, first strap 212 and/or second strap 214 may comprise a length such that first strap 212 and/or second strap 214 may be able to fold up with inflatable 460 in order to stow inflatable 460 into packboard 112. In various embodiments, first strap 212 may be shorter than second strap 214. This may allow BOP to remain closer to packboard 112.

Figure 6:
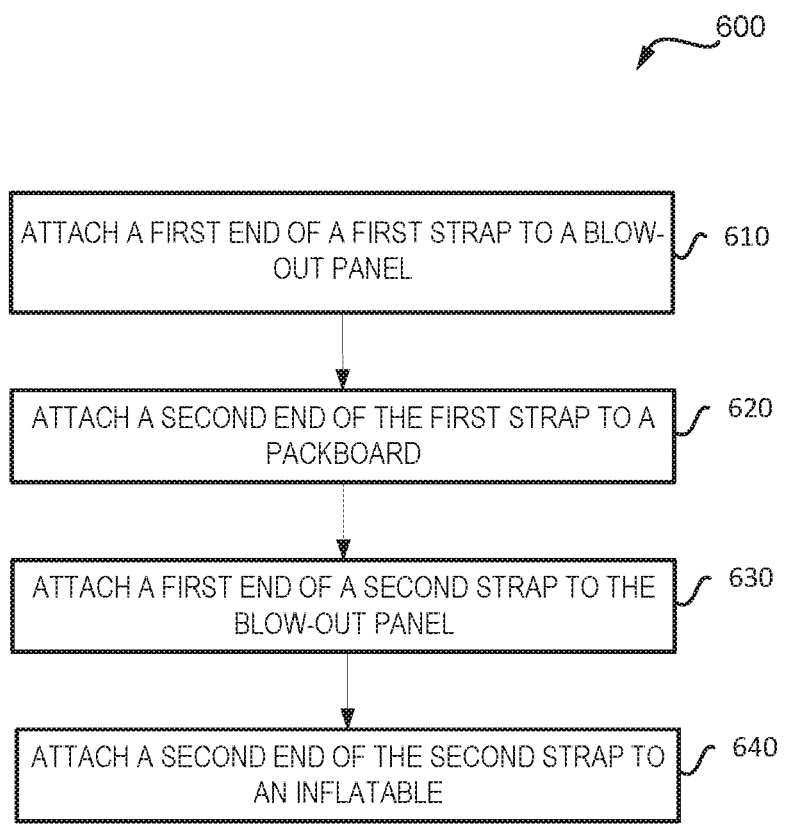
FIG. 6 illustrates a method for retaining a blow-out panel to an evacuation system, in accordance with various embodiments.

With reference to FIG. 6, a method 600 for retaining a blow-out panel to an evacuation system is provided. In various embodiments, method 600 may include attaching a first end of a first strap to a blow-out panel, in step 610. Method 600 may include attaching a second end of the first strap to a packboard, in step 620. Method 600 may include attaching a first end of a second strap to the blow-out panel, in step 630. Method 600 may include attaching a second end of the second strap to an inflatable, in step 640.

With combined reference to FIG. 1, FIG. 2A, FIG. 5, and FIG. 6, step 610 may include attaching first end 282 of first strap 212 to blow-out panel (BOP) 110. Step 620 may include attaching second end 281 of first strap 212 to packboard 112. Step 630 may include attaching first end 283 of second strap 214 to BOP 110. Step 640 may include attaching second end 284 of second strap 214 to inflatable 460.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation system for an aircraft, comprising:
a packboard;
an inflatable configured to be packed into the packboard;
a blow-out panel for the packboard, the blow-out panel having an outboard surface comprising an air-flow surface and having an inner surface;
a first strap coupled to the inner surface of the blow-out panel and to the packboard; and
a second strap coupled to the inner surface of the blow-out panel and to the inflatable,
wherein the first strap is coupled to the blow-out panel in close proximity to a first edge of the blow-out panel and the second strap is coupled to the blow-out panel in close proximity to a second edge of the blow-out panel, the first edge is positioned opposite the blow-out panel from the second edge.

2. The evacuation system of claim 1, further comprising a third strap coupled between the blow-out panel and the packboard.

3. The evacuation system of claim 2, wherein the first strap is located in close proximity to a first corner of the blow-out panel and the third strap is located in close proximity to a second corner of the blow-out panel.

4. The evacuation system of claim 3, wherein the second strap is located between 25% and 75% of a distance between a third corner of the blow-out panel and a fourth corner of the blow-out panel.

5. The evacuation system of claim 1, further comprising a third strap is coupled between the blow-out panel and the inflatable.

6. The evacuation system of claim 5, wherein the second strap is located in close proximity to third corner of the blow-out panel and the third strap is located in close proximity to a fourth corner of the blow-out panel.

7. The evacuation system of claim 6, wherein the first strap is located between 25% and 75% of a distance between a first corner of the blow-out panel and a second corner of the blow-out panel of the blow-out panel.

8. The evacuation system of claim 6, further comprising a fourth strap is coupled between the blow-out panel and the packboard.

9. The evacuation system of claim 8, wherein the first strap is located in close proximity to a first corner of the blow-out panel and the fourth strap is located in close proximity to a second corner of the blow-out panel.

10. The evacuation system of claim 4, wherein the second strap is coupled to an outboard portion of the inflatable in response to the inflatable being in a fully deployed position.

11. A method for retaining a blow-out panel to an evacuation system comprising:
attaching a first end of a first strap to an inner surface of the blow-out panel in close proximity to a first edge of the blow-out panel;
attaching a second end of the first strap to a packboard in close proximity to a second edge of the blow-out panel, wherein the first edge is positioned opposite the blow-out panel from the second edge;
attaching a first end of a second strap to the inner surface of the blow-out panel; and
attaching a second end of the second strap to an inflatable.

12. The method of claim 11, further comprising providing at least one of the first strap, the second strap, the blow-out panel, the packboard, or the inflatable.

13. The method of claim 11, wherein the attaching the second end of the second strap to the inflatable comprises attaching the second end to an outboard portion of the inflatable.

14. The method of claim 11, wherein the attaching includes at least one of sewing, adhering, coupling via a fastener, or coupling via a shackle.

15. The method of claim 11, further comprising,
attaching a first end of a third strap to the blow-out panel; and
attaching a second end of the third strap to the packboard.

16. An evacuation system for an aircraft comprising:
an inflatable;
a packboard for the inflatable;
a plurality of straps;
a blow-out panel coupled between the inflatable and the packboard via the plurality of straps, the plurality of straps including at least a first strap and a second strap,
wherein the at least one first strap is coupled between an inner surface of the blow-out panel and the packboard and the at least one second strap is coupled between the inner surface of the blow-out panel and the inflatable;
wherein the first strap is coupled to the blow-out panel in close proximity to a first edge of the blow-out panel and the second strap is coupled to the blow-out panel in close proximity to a second edge of the blow-out panel, the first edge being is positioned opposite the blow-out panel from the second edge of the blow-out panel; and
the blow-out panel is configured to suspend between an outboard portion of the inflatable and the packboard in response to the inflatable deploying to a fully deployed position.

17. The evacuation system of claim 16, wherein the packboard is located above a wing of the aircraft.

18. The evacuation system of claim 16, wherein the plurality of straps comprises at least one of wire, cable, webbing rope, string, or tape.

19. The evacuation system of claim 16, wherein the second strap is coupled between the inner surface of the blow-out panel and an outboard portion of the inflatable in response to the inflatable deploying to a fully deployed position.

20. The evacuation system of claim 16, wherein the first strap and the second strap are pulled taught in response to the inflatable deploying to the fully deployed position.

\* \* \* \* \*